United States Patent Office 3,501,233
Patented Mar. 17, 1970

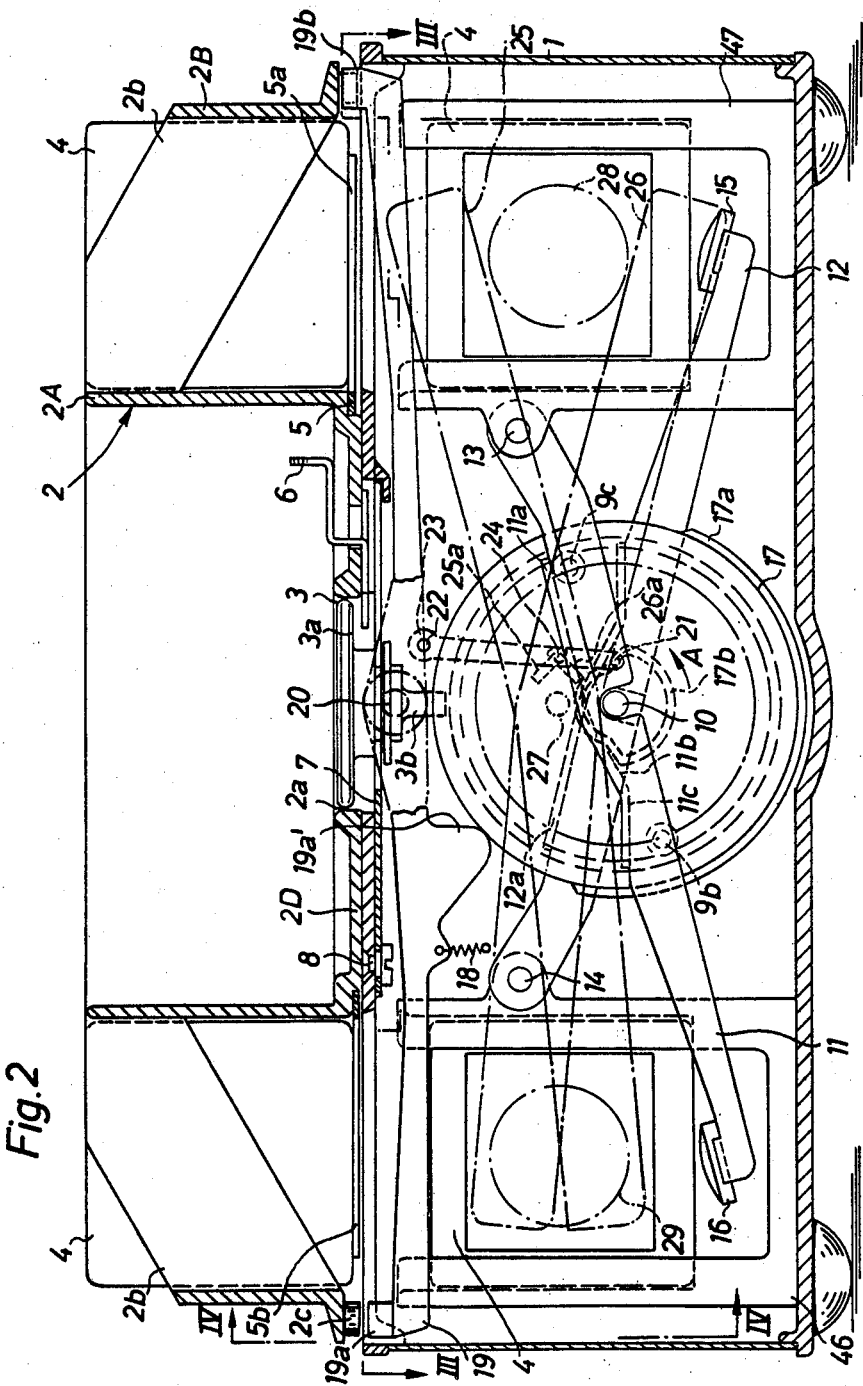

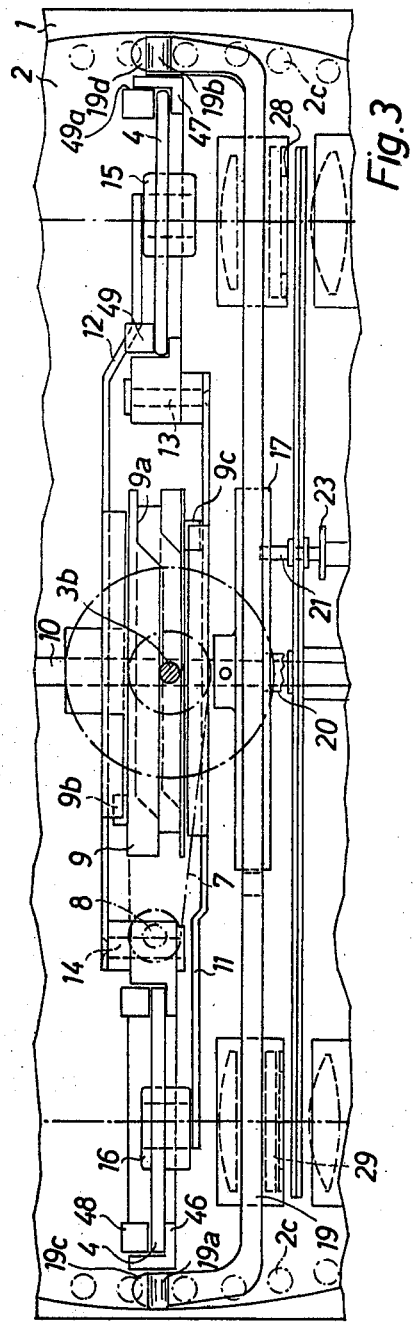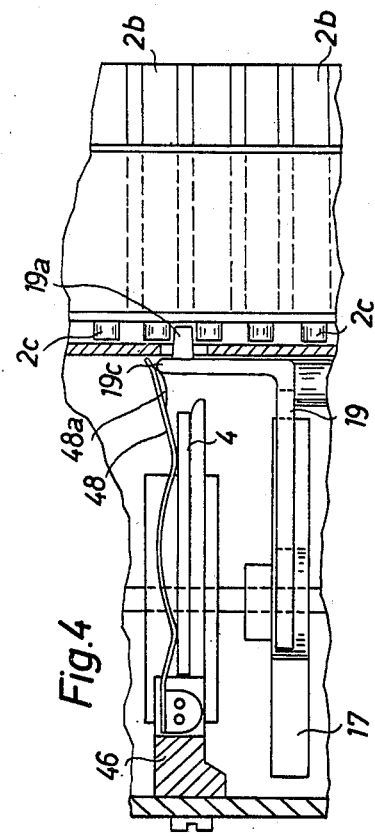

3,501,233
SLIDE PROJECTOR
Alfred Winkler, Munich, and Karl Deeg, Unterhaching, Germany, assignors to Agfa-Gevaert Aktiengesellschaft, Leverkusen, Germany
Filed Sept. 6, 1967, Ser. No. 665,758
Claims priority, application Germany, Sept. 10, 1966, A 53,476
Int. Cl. G03b 21/14, 23/06
U.S. Cl. 353—89         20 Claims

ABSTRACT OF THE DISCLOSURE

Slide projector with two lamps and two projection lenses which throw images onto the same area. A carrousel type magazine accommodates slides in two groups so that each oddly numbered slide is located diametrically opposite the next following or preceding evenly numbered slide. The magazine is indexed by alternately rocking about two eccentric axes to place successive pairs of oddly and evenly numbered slides into registry with two platforms each located in front of one of the lamps. Two levers receive motion from a shaft to move slides between the magazine and the platforms so that a fresh slide is held ready on one platform when the projection of the slide on the other platform is completed. Two shutter blades operate in synchronism with the levers to intercept light from one lamp when the image of the slide in front of the other lamp is being projected and vice versa.

Background of the invention

The present invention relates to slide projectors in general, and more particularly to improvements in slide projectors of the type having two projection lamps and two projection lenses so that a fresh slide of a series of slides can be placed into registry with one projection lens while the other lens projects the image of the preceding slide, and vice versa.

Heretofore known slide projectors with two projection lenses normally carry two magazines or trays, i.e., the oddly numbered slides are accommodated in the one and the evenly numbered slides are accommodated in the other magazine. This is undesirable for many reasons, particularly because the magazines occupy too much room in storage and because the housing of the projector must be large enough to carry two magazines at a time.

It is also known to design a slide projector with two lenses for use with a single magazine or tray and with very bulky, complicated, expensive and delicate mechanisms which insure that the slides are withdrawn from and returned into the magazine in proper sequence. Also, the indexing mechanism for such magazines is very complicated and contributes excessively to the initial cost of the slide projector, particularly since the indexing mechanism performs no other function.

Summary of the invention

It is an important object of our invention to provide a novel and improved slide projector with two projection lamps and two projection lenses and to construct and assemble the projector in such a way that it can be used in connection with a single magazine or tray of novel or conventional design, that it can automatically prepare a fresh slide for projection of its image while the image of the preceding slide is being projected onto a screen, and to provide the projector with a simple and compact mechanism which enables the operator to direct the image of each slide onto the same area of the projection screen.

Another object of our invention is to provide a projector for slides or diapositives which can be manipulated by unskilled persons, which can be designed to hold a slide in projection position for any desired interval of time, which need not occupy more room than a conventional projector with a single lens, and wherein each slide is properly retained in projection position to the very moment when it is ready to be returned into the corresponding compartment of the magazine.

A further object of the invention is to provide a novel drive for the moving parts of a slide projector with two projection lens systems in such a way that the projection of successive images takes place without intervals.

An additional object of the invention is to provide a novel indexing mechanism for use in a slide projector of the above outlined character and to construct the drive for the indexing mechanism in such a way that it can perform one or more important functions in addition to the function of moving the magazine in stepwise fashion.

A concomitant object of the invention is to provide the slide projector with a simple shutter assembly which automatically uncovers one of two exposure apertures when the other aperture is closed and vice versa without any appreciable pause between successive projections.

An ancillary object of the invention is to provide a slide projector which can employ conventional magazines or trays or which can employ trays that are only slightly different from presently known trays.

Briefly outlined, the improved slide projector comprises a housing which accommodates two projection lenses each located in front of an exposure aperture which, in turn, is located in front of one of two projection lamps. The housing supports a rotary magazine of the type known as carrousel tray which has radially extending compartments arranged in two groups one of which accommodates successive oddly numbered slides of a series of say eighty or a hundred slides and the other of which accommodates the evenly numbered slides of the same series in such a way that an oddly numbered slide ($n+1$) is located substantially diametrically opposite the preceding evenly numbered slide ($n$) of the series. The housing accommodates transfer means for respectively transferring successive evenly and oddly numbered slides between the magazine on the housing and a position of registry with the respective lens system, shutter means for blocking the passage of light through an oddly numbered slide while the light passes through an evenly numbered slide or vice versa, and indexing means for advancing the magazine in stepwise fashion, preferably by rocking the magazine about two pivot axes which are respectively adjacent to those compartments from which the slides are withdrawn to have their images projected onto the screen.

The housing further accommodates a drive which operates the indexing means, the shutter means and the transfer means in a predetermined sequence. Such drive can further cause the indexing means to effect movement of suitable retaining springs against those slides which are held in projection position to insure that each such slide is held in the focal plane of the respective projection lens system.

The novel features which are considered as characteristic of the invention are set forth in particular in the appended claims. The improved slide projector itself, however, both as to its construction and its mode of operation, together with additional features and advantages thereof, will be best understood upon perusal of the following detailed description of certain specific embodiments with reference to the accompanying drawing.

Brief description of the drawing

FIG. 2 is an enlarged vertical section as seen in the direction of arrows from the line II—II of FIG. 1;

FIG. 3 is a fragmentary horizontal section as seen in the direction of arrows from the line III—III of FIG. 2; and FIG. 4 is a fragmentary vertical section as seen in the direction of arrows from the line IV—IV of FIG. 2.

Description of the preferred embodiments

Figure 1:
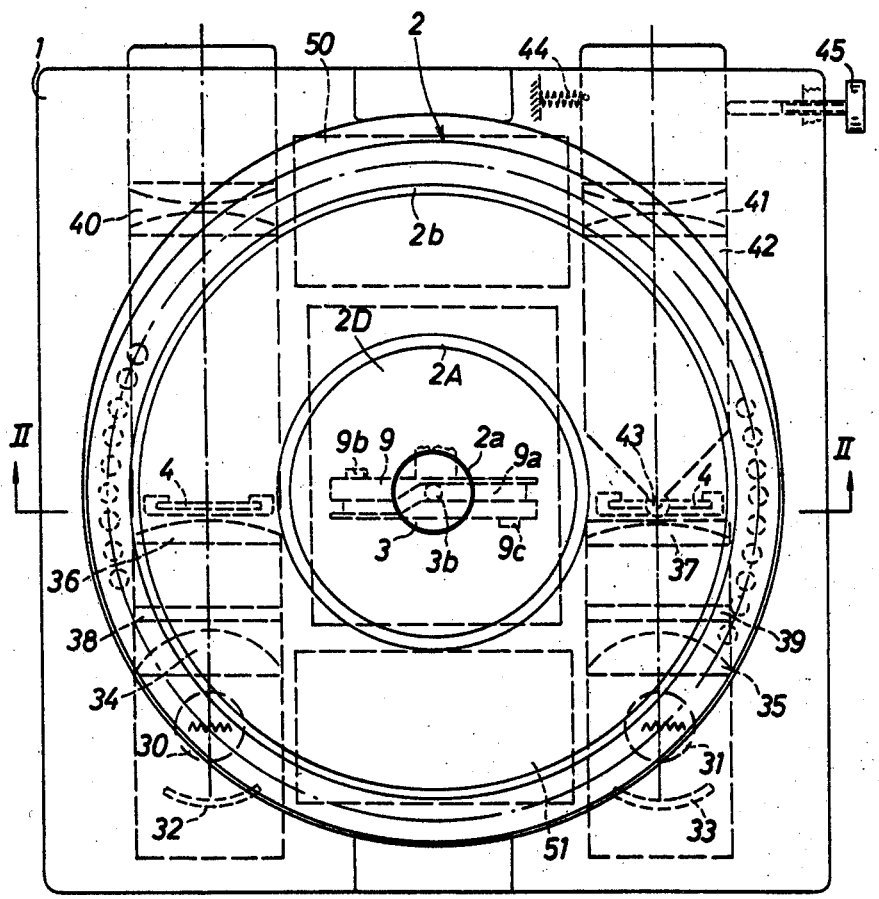
FIG. 1 is a top plan view of a slide projector which embodies our invention.

Referring first to FIGS. 1 and 2, there is shown a slide projector with two projection lens systems. The projector comprises a substantially rectangular housing or case 1 which supports a round (carrousel type) magazine or tray 2. The latter comprises two concentric cylindrical walls 2A, 2B and a plurality of radial slide compartments 2b extending between the walls 2A, 2B. The bottom wall 2D of the magazine 2 is surrounded by the inner cylindrical wall 2A and has a central opening 2a which accommodates the head of a centering and indexing mandrel 3. The compartments 2b form two groups each of which occupies one-half of the annular space between the cylindrical walls 2A, 2b. The arrangement is such that the oddly numbered slides 4 of a series of say eighty or hundred slides are inserted in one group and the evenly numbered slides 4 of such series are inserted into the other group of compartments 2b. In other words, an evenly numbered slide 4 ($n$, $n+2$, $n+4$, $n+6$, etc.) is located substantially diametrically opposite the next-following oddly numbered slide 4 ($n+1$, $n+3$, $n+5$, $n+7$, etc.), as considered with reference to the axis of the magazine 2. The slides 4 can be inserted into and withdrawn from the respective compartments from above, as viewed in FIG. 2. The lower ends of the slide compartments 2b are closed by a turnable disk-shaped gate 5 which is mounted on the bottom wall 2D and has two passages or slots 5a, 5b extending radially of the magazine 2 and disposed substantially diametrically opposite each other. The width of each of these slots 5a, 5b approximates the thickness of the frame of a slide 4. The gate 5 is affixed to the housing 1 when the magazine 2 is properly mounted on the housing so that the walls 2A, 2B, 2D and the compartments 2b can turn with reference to the gate in order to place successive evenly and oddly numbered slides 4 into registry with the slots 5a and 5b. The means for releasably fixing the gate 5 to the housing 1 is not shown in the drawing.

The magazine 2 further comprises a radially movable locking bolt 6 (see FIG. 2) which can engage a shoulder 3a at the underside of the head of the mandrel 3 to temporarily connect the magazine to the housing 1 but to permit rapid detachment of the magazine in response to movement of the locking bolt 6 in a direction to the right, as viswed in FIG. 2. The bolt 6 is preferably biased to locking or coupling position by a suitable spring, not shown. This bolt is mounted on the bottom wall 2D and its main purpose is to prevent unintentional detachment of the magazine 2 from the top panel of the housing 1.

The aforementioned centering and indexing mandrel 3 extends vertically and is mounted on a first indexing lever 7 which is turnable about a vertical pivot pin 8 attached to the top panel of the housing 1. The pin 8 is mounted eccentrically with reference to the magazine 2 as clearly shown in FIG. 2. The mandrel 3 comprises a cylindrical cam follower pin 3b which extends vertically downwardly into the suitably configurated endless circumferential groove 9a of a first operating cam 9. The configuration of the cam groove 9a is best shown in FIG. 3. The cam 9 is mounted on a horizontal drive shaft 10 which is parallel with the direction in which the images of the slides 4 are projected onto a screen (not shown). The cam 9 is further provided with two motion transmitting pins or posts 9b, 9c which cooperate with motion receiving portions 11a, 12a of transfer members 11, 12 pivotably mounted on pins 13, 14 provided in the housing 1 (see particularly FIG. 2). The drive shaft 10 is arranged to rotate in a counterclockwise direction (see the arrow A in FIG. 2). The free ends of the transfer members 11, 12 carry roof-shaped lifting elements 16, 15 which preferably consist of synthetic plastic material and serve to transfer slides 4 from the repsective compartments 2b into projection positions and vice versa. The lifting elements 15, 16 engage the lower edge faces of frames on the slides which respectively register with the slots 5a, 5b of the gate 5. This is clearly shown in FIG. 2.

The drive shaft 10 further carries a second operating or control cam 17 whose periphery is provided with an elongated arcuate cam lobe 17a. The lobe 17a cooperates with the follower or nose 19a' of a second indexing lever 19 which is turnable on a horizontal pivot pin 20 of the housing 1 and is biased against the control cam 17 by a spring 18. The indexing lever 19 resembles a balance beam and carries two upwardly extending arresting projections or teeth 19a, 19b which can cooperate with an annulus of rounded projections or teeth 2c provided at the underside of the magazine 2 and outwardly adjacent to the cylindrical wall 2B. The teeth 19a, 19b are respectively provided at the free ends of the lever 19. The arrangement is such that the tooth 19a engages with the adjoining teeth 2c when the tooth 19b is moved downwardly and away from the underside of the magazine 2, and vice versa. The distribution of teeth 2c is the same as that of the slide compartments 2b.

The front face of the control cam 17 has an endless cam groove 17b which receives a pin-shaped follower 21 forming part of a shutter actuating lever 23 which is turnable on a horizontal pivot pin 22 of the housing 1 (see FIG. 2). The lever 23 has a projection 24 extending into the slots 25a, 26a of two winged shutter blades 25, 26. These blades 25, 26 are pivotally mounted on a horizontal pin 27 of the housing 1 so that they can turn about a pivot axis which is parallel to the axis of the drive shaft 10 and pivot pins 13, 14, 20 and 22. When the shaft 10 rotates in the direction indicated by arrow A, the shutter actuating lever 23 rocks back and forth about the pivot pin 22 and its projection 24 causes the shutter blades 25, 26 to rock in opposite directions about the pivot pin 27 whereby the end portions or vanes of the shutter blades cooperate to permit passage of light through one of the slides 4 which has been lowered to projection position but prevent passage of light through another slide which is also held in projection position. The shutter blades 25, 26 together form twin or dual shears and their vanes move substantially up and down but in opposite directions when the actuating lever 23 receives motion from the control cam 17 in response to rotation of the drive shaft 10. The exposure apertures for the two slides which are held in positions for projection of their images onto a screen are shown at 28 and 29.

The projection systems of the slide projector comprise two low-voltage projection lamps 30, 31 (see FIG. 1), reflectors 32, 33 which are respectively associated with the lamps 30, 31, condenser lenses 34, 35, 36, 37, two protective heat-resistant filters or shields 38, 39, and two objective lenses or projection lenses 40 and 41. Each slide which has been lowered to projection position is located in the focal plane of one of the objective lenses 40, 41. The space between the two projection systems accommodates an electric motor 50 which drives the shaft 10, and a transformer 51 which supplies low-voltage current to the lamps 30 and 31.

In order to facilitate accurate adjustment of one of the objective lenses so that the image of an oddly numbered slide will be projected onto the same area of a screen as the image of an evenly numbered slide, the objective lens 41 is adjustable with reference to the housing 1 in a manner as illustrated in the upper right-hand portion of FIG. 1. This objective lens 41 is mounted on an adjusting lever 42 which is turnable about the axis of a vertical pivot pin 43 located in the focal plane of the objective lens 41. A spring 44 biases the adjusting lever 42 against the tip of a manually operable screw 45. To eliminate parallax errors, the operator will simply turn the screw 45 until the image of an evenly numbered slide is projected onto the same spot as the image of an oddly numbered slide or vice versa. For example, the screen can be placed at a distance of 2–7 meters from the housing 1.

The housing 1 further accommodate two platforms or sockets 46, 47 respectively serving to support such oddly and evenly numbered slides which assume their projection positions. These platforms respectively cooperate with U-shaped retaining springs 48, 49 to insure that each lowered slide 4 is held exactly in the focal plane of the respective objective lens. The retaining springs 48, 49 respectively comprise followers 48a, 49a which can be engaged by projections 19c, 19d provided on the arresting lever 19. In each of its end positions, the arresting lever 19 moves one of the retaining springs 48, 49 away from the adjacent slide 4 so that the thus released slide 4 can be transported back into the respective compartment 2b of the magazine 2. The mounting of the retaining spring 48 is best shown in FIG. 4. As stated before, the means for transporting the slides 4 between projection positions (in the platforms 46, 47) and the respective compartments 2b comprises the members 11 and 12 each of which resembles a one-armed lever.

The operation is as follows:

In the position of parts as shown in FIG. 2, each of the platforms or sockets 46, 47 accommodates a slide 4 in projection position. The image of the evenly numbered slide 4 which is supported by the platform 47 is being projected onto the screen because the right-hand vanes of the shutter blades 25, 26 permit the passage of light from the corresponding projection lamp 31, through the aperture 28, through the right-hand (evenly numbered) slide 4 and through the objective lens 41. The left-hand vanes of the blades 25, 26 overlie the exposure aperture 29. The motor 50 drives the shaft 10 in a counterclockwise direction (arrow A) whereby the motion transmitting pin 9c of the cam 9 lifts the portion 11a of the transfer lever 11 so that the latter turns on the pivot pin 13 in a clockwise direction, as viewed in FIG. 2, and causes its plastic lifting element 16 to raise the left-hand (oddly numbered) slide 4 from the platform 46, through the registering slot 5b of the gate 5, and back into the corresponding compartment 2b of the magazine 2. The left-hand vanes of the shutter blades 25, 26 continue to overlie the exposure aperture 29. The tooth 19a of the second indexing lever 19 is disengaged from the rounded teeth 2c of the magazine 2 and the projection 19c bears against the follower 48a of the retaining spring 48 (FIG. 4) so that the latter permits unimpeded return movement of the oddly numbered slide 4 from platform 46 back into the magazine.

The drive shaft 10 continues to rotate in the direction indicated by arrow A whereby the follower pin 3b of the mandrel 3 enters the offset portion of the groove 9a in the indexing cam 9 so that the indexing lever 7 turns on the pivot pin 8 and causes the mandrel 3 to place the next-following left-hand slide compartment 2b into registry with the slot 5b and platform 46. Since the lifting element 16 of the transfer lever 11 is roof shaped, it permits the frame of an oddly numbered slide 4 in the next compartment 2b to slide thereover without causing jamming or blocking of the magazine. During rocking of the magazine on the tooth 19a, the motion transmitting pin 9c of the cam 9 travels along a substantially horizontal stretch or part 11b of the portion 11a so that the transfer member 11 remains in its upper end position in which the lifting element 16 is located directly or closely below the slot 5b.

When the magazine 2 completes its rocking movement about the pin 8, a fresh oddly numbered slide 4 is in registry with the slot 5b and the motion transmitting member 9c travels along the radially outermost part 11c of the portion 11a to permit downward movement of the lever 11 at a relatively high speed (in a counterclockwise direction, as viewed in FIG. 2) whereby the fresh oddly numbered slide 4 descends onto the platform 46. The lobe 17a of the control cam 17 engages with the follower 19a of the indexing lever 19 and turns the latter in a clockwise direction to move the tooth 19a upwardly into engagement with rounded teeth 2c and to simultaneously lower the tooth 19b away from the magazine 2. Thus, the tooth 19a then insures that the empty left-hand compartment 2b remains in registry with the slot 5b and platform 46. As the tooth 19b descends, the projection 19d of the arresting lever 19 moves against the follower 49a of the retaining spring 49 and causes the latter to release the evenly numbered slide 4 which is supported by the platform 47. The projection 19c of the arresting lever 19 allows the spring 48 to bear against the freshly transferred oddly numbered slide 4 on the platform 46 so that such slide is held in the focal plane of the objective lens 40.

During the just described stages of an operating cycle, the drive shaft 10 has completed substantially one-half of a full revolution so that the groove 17b of the control cam 17 causes the actuating lever 23 to turn the shutter blades 25, 26 in opposite directions whereby the left-hand vanes of these blades move away from the exposure aperture 29 so that the image of the oddly numbered slide on the platform 46 is projected onto the screen while the right-hand vanes of the blades 25, 26 move into overlapping position with reference to the aperture 28. It is to be noted that FIG. 2 illustrates the shutter blades 25, 26 in positions they assume immediately after they are caused to cover the aperture 29, i.e., that the blades 25, 26 dwell in such positions during rotation of the shaft 10 through approximately 180 degrees which suffices to project the image of the evenly numbered slide on platform 47 and to replace the oddly numbered slide on the platform 46 with a fresh oddly numbered slide. The projection of the image on the oddly numbered slide which is supported by the platform 46 begins simultaneously with closing of the aperture 28 so that the images of successive slides are projected without any or with hardly detectable interruptions.

The motor 50 preferably drives the shaft 10 through the intermediary of a suitable clutch (not shown) which can be disengaged by hand so that the operator of the projector can select the length of intervals during which the images of slides are being projected onto the screen. Also, such clutch may receive motion through a suitable transmission so that the slides can be changed automatically but at two or more speeds as is well known from the art of projectors with a single projection lens system.

As the shaft 10 continues to rotate in the direction of the arrow A, the roof-shaped element 15 of the other transfer member 12 lifts the evenly numbered slide from the platform 47 and returns it into the corresponding compartment of the magazine 2. The latter is rocked by the cam 9 and mandrel 3 to place a fresh evenly numbered slide into registry with the slot 5a. Such fresh evenly numbered slide is transferred onto the platform 47 not later than at the time when the actuating lever 23 causes the blades 25, 26 to cover the aperture 29 and to expose the aperture 28.

It will be seen that a complete cycle includes:

(a) Rocking the magazine 2 about the tooth 19b to place an oddly numbered slide ($n+1^{st}$ slide) into registry with the slot 5b;

(b) Lowering the $n+1^{st}$ slide with the transfer member 11 to projection position on the platform 46;

(c) Arresting the compartment 2b for the $n+1^{st}$ slide by moving the tooth 19a into engagement with adjoining teeth 2c;

(d) Simultaneously biasing the $n+1^{st}$ slide against the platform 46 (by means of the spring 48);

(e) Obstructing the passage of light through the aperture 28 and simultaneously moving the blades 25, 26 away from the aperture 29;

(f) Lifting the preceding ($n^{\text{th}}$) slide of the series off the platform 47 (by means of the transfer member 12);

(g) Rocking the magazine 2 about the tooth 19a to place the $n+2^{\text{nd}}$ slide into registry with the slot 5a;

(h) Lowering the $n+2^{\text{nd}}$ slide onto the platform 47;

(i) Simultaneously arresting the magazine by moving the tooth 19b into engagement with the adjoining teeth 2c and biasing the $n+2^{\text{nd}}$ slide against the platform 47 while the spring 48 releases the $n+1^{\text{st}}$ slide;

(j) Moving the blades 25, 26 away from the aperture 28 and closing the aperture 29;

(k) Returning the $n+1^{\text{st}}$ slide into the corresponding compartment 2b.

The housing 1 occupies relatively little room because the motor 50, transformer 51 and certain other parts (such as the drive shaft 10 and the aforementioned clutch) can be readily accommodated in the space between the two projection lens and lamp systems. Though it is possible to provide adjusting means for both objective lenses (40, 41), a single adjusting means is normally sufficient to insure that both objective lenses will project images onto the same area of the screen. The indexing mechanism including the mandrel 3, cam 9, lever 17 and lever 19 turns the magazine 2 unidirectionally and stepwise about two axes, namely, about the axes defined by the teeth 19a, 19b. The magazine 2 turns about the tooth 19a to place an evenly numbered slide into registry with the slot 5a and about the tooth 19b to place an oddly numbered slide into registry with the slot 5b. Such arrangement insures that an empty compartment 2b remains in registry with the slot 5a or 5b when the respective slide rests on the platform 47 or 46 and while such slide moves between the magazine and the respective compartment.

The drive shaft 10 transmits motion to the mandrel 3 and indexing lever 7 through the cam 9, to the shutter blades 25, 26 through the actuating lever 23 and cam groove 17b, to the indexing lever 19 through the lobe 17a of the cam 17, and to the transfer members 11, 12 through the projections 9b, 9c of the indexing cam 9. As stated before, the drive shaft 10 completes one-half of a revolution during each interval between successive indexing movements of the magazine 2. Such arrangement renders it possible to employ a very simple system of cams because the movements of transfer members 11, 12 and of several other parts repeat themselves after the drive shaft 10 completes a full revolution.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

We claim:

1. A slide projector, comprising a housing; first and second projection lamp and objective lens systems in said housing; an indexible carrousel type slide magazine carried by said housing and having first and second groups of radially extending slide compartments respectively accommodating oddly and evenly numbered slides of a series, the compartment for an oddly numbered slide being located substantially diametrically opposite the compartment for the next-following evenly numbered slide of said series; transfer means for respectively transferring successive oddly and evenly numbered slides between said magazine and a position of registry with said first and second lens systems; shutter means for blocking the projection of image of an evenly numbered slide during the projection of image of an oddly numbered slide and vice versa, said transfer means comprising first and second transfer devices for respectively placing a fresh oddly numbered slide into registry with said first lens system before said shutter means blocks the projection of image of an evenly numbered slide which registers with said second lens system and vice versa; and indexing means for alternately rocking said magazine about a pair of pivot axes disposed substantially diametrically opposite each other with reference to said magazine so as to place successive oddly and evenly numbered slides into the range of said transfer means.

2. A slide projector as defined in claim 1, wherein each of said pivot axes is adjacent to one of the two compartments whose slides are held in registry with the respective lens systems.

3. A slide projector as defined in claim 2, wherein said magazine comprises an annulus of projections distributed in the same way as said compartments and wherein said indexing means comprises an indexing member having a pair of projections each movable into engagement with the projections of said magazine to thereby define one of said pivot axes.

4. A slide projector as defined in claim 3, wherein said indexing member comprises a balance beam and pivot means securing said balance beam to said housing, each projection of said indexing member being provided at one end of said balance beam.

5. A slide projector as defined in claim 4, wherein said indexing means further comprises a centering member for said magazine and means for rocking said centering member about an axis which is eccentric with reference to the magazine axis.

6. A slide projector as defined in claim 5, wherein said centering member is a mandrel extending into a central opening of said magazine and the means for rocking said mandrel comprises an indexing lever and a driven operating cam, said centering member having follower means tracking said operating cam to rock said magazine about said pivot axes to the extent necessary to place successive oddly and evenly numbered slides into the range of said transfer means.

7. A slide projector as defined in claim 6, wherein said cam is arranged to rock said lever and said magazine through angles necessary to place successive projections of said magazine into the range of projections on said balance beam.

8. A slide projector as defined in claim 1, wherein said transfer devices comprise lifting portions movable between raised positions in which they receive slides from said compartments and lowered positions in which they place such slides into registry with the respective lens systems.

9. A slide projector as defined in claim 1, further comprising drive means for operating said shutter means, said transfer means and said indexing means in a predetermined sequence.

10. A slide projector as defined in claim 9, wherein said drive means comprises a rotary drive shaft arranged to complete one-half of a revolution between successive indexing movements of said magazine.

11. A slide projector as defined in claim 10, further comprising cam means provided on said drive shaft and arranged to operate said indexing, transfer and shutter means in response to rotation of said drive shaft.

12. A slide projector as defined in claim 1, further comprising drive means for said transfer means and said shutter means, said drive means comprising a drive shaft and means for operating said shutter means in response to rotation of said shaft.

13. A slide projector as defined in claim 12, wherein said housing defines a pair of exposure apertures each located intermediate one of said projection lamp systems and the respective lens system, said shutter means comprising a pair of blades each having two vanes, said blades being rockable by said drive shaft between two end positions so that one vane of each blade covers one of said apertures in one end position and the other vane of each blade covers the other aperture in the other end position of said blades.

14. A slide projector as defined in claim 1, further comprising socket means for supporting the slides in their positions of registry with the respective lens systems and retaining means for yieldably holding such slides in their socket means during projection of images.

15. A slide projector as defined in claim 14, wherein said indexing means comprises means for disengaging said retaining means from the slides in the respective socket means prior to return of such slides into the respective compartments.

16. A slide projector as defined in claim 1, further comprising means for adjusting at least one of said lens systems with reference to said housing so that the images of all slides can be projected onto the same area of a screen.

17. A slide projector as defined in claim 1, further comprising drive means for operating said indexing, transfer and shutter means in a predetermined sequence, said drive means comprising motor means located in said housing intermediate said systems.

18. A slide projector as defined in claim 17, further comprising means for supplying current to said projection lamp systems, said current supplying means being located in said housing intermediate said systems.

19. A slide projector as defined in claim 20, wherein said gate is disposed directly below said compartments and said passages are located diametrically opposite each other.

20. A slide projector, comprising a housing; first and second projection lamp and objective lens systems in said housing; an indexible carrousel type slide magazine carried by said housing and having first and second groups of radially extending slide compartments respectively accommodating oddly and evenly numbered slides of a series, said magazine comprising a ring-shaped gate connectable with said housing and having first and second passages; transfer means for respectively transferring successive oddly and evenly numbered slides between said magazine and a position of registry with said first and second lens systems; shutter means for blocking the projection of image of an evenly numbered slide during the projection of image of an oddly numbered slide and vice versa; and indexing means for moving the remainder of said magazine stepwise with reference to said gate to respectively place successive oddly and evenly numbered slides of said series into registry with said first and second passages, said transfer means being arranged to lower the slides which register with said passages into registry with said lens systems.

References Cited

UNITED STATES PATENTS

| | | | |
|---|---|---|---|
| 1,321,241 | 11/1919 | Olvis | 353—89 |
| 3,194,115 | 7/1965 | Giwosky | 353—89 X |
| 3,276,314 | 10/1966 | Robinson | 353—107 |
| 3,308,718 | 3/1967 | Antos | 353—89 |

SAMUEL S. MATTHEWS, Primary Examiner

U.S. Cl. X.R.

353—94, 111